United States Patent [19]

Smith et al.

[11] Patent Number: 4,956,162
[45] Date of Patent: Sep. 11, 1990

[54] PROCESS FOR REMOVAL OF PARTICULATES AND $SO_2$ FROM COMBUSTION GASES

[75] Inventors: Wallace B. Smith, Trussville, Ala.; Dan V. Giovanni, Berkeley, Calif.

[73] Assignee: Electric Power Research Institute, Inc., Palo Alto, Calif.

[21] Appl. No.: 227,269

[22] Filed: Aug. 2, 1988

Related U.S. Application Data

[63] Continuation-in-part of Ser. No. 874,706, Jun. 16, 1986, abandoned.

[51] Int. Cl.$^5$ .......................... B01J 8/00; C01B 17/00; C01B 45/00
[52] U.S. Cl. .................................. 423/244; 423/215.5
[58] Field of Search ............................. 423/244, 215.5

[56] References Cited

U.S. PATENT DOCUMENTS 4,478,810 10/1984 Bloss et al. .......................... 423/555
4,559,211 12/1985 Feldman et al. ..................... 423/242

Primary Examiner—Robert L. Stoll
Assistant Examiner—Lori F. Cuomo
Attorney, Agent, or Firm—Armstrong, Nikaido, Marmelstein, Kubovcik & Murray

[57] ABSTRACT

This invention pertains to methods for removal of pollution from the exhaust gas stream of combustion sources. More particularly, the invention relates to an improved method of elimination of particulate matte, sulfur dioxide ($SO_2$) and volatile toxic materials from the flue gas of coal fired boilers, especially in large electric generating plants.

8 Claims, 3 Drawing Sheets

PROCESS FOR REMOVAL OF PARTICULATES AND SO2 FROM COMBUSTION GASES

This application is a continuation-in-part of our earlier application Serial Number 874,706, filed June 16, 1986 now abandoned.

BACKGROUND OF THE INVENTION

This invention pertains to methods for removal of pollution from the exhaust gas stream of combustion sources. More particularly, the invention relates to an improved method of elimination of particulate matter, sulfur dioxide ($SO_2$) and volatile toxic materials from the flue gas of coal fired boilers, especially in large electric generating plants.

Because of increasing public concern over deterioration of the environment, industries are being required by current and anticipated regulations to limit the emission of particulate matter, toxic materials (e.g., volatile metals or organic materials), and precursors to acid rain ($SO_x$, $NO_x$) into the atmosphere. Unfortunately, many processes for controlling these pollutants are either unproven or expensive. Known $SO_2$ removal and collecting processes include wet scrubbers, spray dryers, and dry furnace sorbent injection. Modern methods of collecting particulates include fabric filters (baghouses), electrostatic precipitators, and wet scrubbers. Methods of collecting volatile toxic materials are not well established, but are generally based on scrubber or filter technology. A discussion of each of these systems follows.

In wet flue gas desulfurization systems, also called wet scrubbers, small droplets of slurry containing water and alkaline material are sprayed into the flue gas, where it reacts with $SO_2$ and the reacted products are collected together as a liquid. Wet scrubbers have high collection efficiency and are the only systems considered commercially available for over 90% $SO_2$ removal on boilers firing high sulfur fuels. This system has the disadvantages of large capital costs, high maintenance costs, and the need to dispose of the solid wastes produced by the process. Also, wet scrubbers may emit a significant plume of evaporation residue and $H_2SO_4$ into the atmosphere.

Spray dryers are another system of sulfur removal, wherein fine droplets of slurry are sprayed into the flue gas to react with $SO_2$ and then evaporate to become airborne solid particulate residue. This residue is then collected in a baghouse in which the flue gas is filtered for removal of particulates. Spray dryers are lower cost then wet scrubbers, and generate less sludge, but their performances may not be adequate for high-sulfur fuels. Furthermore, disposal is complicated by the addition of sorbent to the collected ash particulates. Also, the flue gas temperature is lowered dramatically by the evaporation of water which may lead to corrosion of baghouse components. Water consumption by spray dryer processes are nearly equivalent to those for wet scrubbers.

Dry sorbent injection is a third method of sulfur removal. An alkaline powder is blown into the flue gas and reacts with the $SO_2$. The reactants are then collected in an electrostatic precipitator or a baghouse, where the sorbent may react further with the $SO_2$. The capital cost of such a system is significantly lower than that for scrubbers or spray dryers. However, the $SO_2$ removal efficiency is lower than for wet scrubbers and spray dryers.

The predominant system of particulate removal at coal fired power plants is the electrostatic precipitator (ESP). An ESP consists of a series of pairs of electrodes maintained at a high voltage difference within a gas passage for ionizing the air. As dust or ash laden air passes between the electrodes, the particles are also ionized and move in the electrical fields to be collected on one of the electrodes. The material that is collected is periodically dumped into hoppers by mechanical means and removed to a disposal site. ESPs have been selected as the particulate removal means in the past due to their low cost. However, with more stringent removal requirements, alternate technologies have become competitive, since ESPs are extremely sensitive to dust properties (i.e., coal types).

Baghouses consist of an array of tubular fabric filterbags within a large housing through which flue gas containing dust or ash is drawn by a large fan. The filterbags are cleaned periodically be reversing the gas flow and/or shaking. The particles are collected in hoppers for disposal. Baghouses are relatively insensitive to the properties of the particulates and have a very high collection efficiency.

Wet scrubbers may also be utilized to remove particulates, but more energy is required than for sulfur removal. At present, scrubbers are not efficient enough to compete with ESPs and baghouses.

Many toxic materials, such as lead, selenium, arsenic, etc. have the property that they are in vapor phase at flue gas temperatures, but condense at atmospheric temperatures to become solid or liquid particles, a form potentially hazardous to human health. As vapors, these materials may pass through baghouses and precipitators virtually unaffected. In scrubbers, they condense because of the lower temperatures and then pass through as solid or liquid particles because of the low collection efficiency. The common means of collecting such materials is to reduce the flue gas temperature by some means, condense the material to particulate form, and then collect it in ESPs or baghouses. This can be done by using "wet" ESPs wherein water is sprayed into the inter-electrode space to cool the gas, or in regular ESPs and baghouses by preceding them with spray towers or heat exchangers to lower the temperature of the flue gas and cause the vapors to condense. These techniques waste heat energy if water is used and may cause low-temperature corrosion in downstream components if either water or heat exchangers are used.

SUMMARY OF THE INVENTION

The present invention is a process which comprises the removal of fly ash particulate matter from the flue gas of a coal fired combustion boiler, then using fabric filters to remove the $SO_2$ by the injection of dry sorbent into the flue gases prior to entering the baghouse. If the combustion gas is cooled before entering the baghouse, volatile toxic materials are removed as well.

More specifically, the flue gas exiting from a boiler which uses coal as a fuel is directed to an electrostatic precipitator (ESP), then the particulate matter, principally coal fly ash, is collected in an ESP. Dry sodium based or calcium based sorbent powders are injected into the relatively particle-free flue gas between the ESP and a baghouse to react with the $SO_2$. The sorbent $SO_2$ product and unreacted sorbent are collected on the filter bags where reaction and collection of $SO_2$ continue to occur. The material collected on the filter bags is removed periodically in the normal fashion, but because it contains relatively minute amounts of dust or ash, it could be routed to disposal facilities, recycled, or regenerated more conveniently and much more economically.

With incorporation of heat extraction, energy may be advantageously recovered which is normally lost in conventional systems either due to water injection for enhanced $SO_2$ removal or merely by being vented to the atmosphere. This energy savings may be sufficient to offset large part of the cost of the entire process.

Since the reactant sorbent is injected into the flue gas before the temperature is reduced, in some embodiments, the corrosive elements of the flue gas, such as sulfuric acid, are neutralized, and low-temperature corrosion is not a problem. Further, since the injected sorbent material contains fewer submicron particles than fly ash, the baghouse size, and hence cost, could be significantly reduced relative to currently used baghouses.

Furthermore, the high collection efficiency of the fabric filter will serve to augment the collection of fly ash particles in cases where the performance of ESPs are marginal or emissions limits are exceeded. The fabric filter would be the final emissions control device in the combustion flow path, thereby assuring a clear stack independent of coal selection.

Therefore, it is an object of the present invention to provide a more economical process for removal of pollutants from the exhaust flue gas stream of a coal fired boiler.

It is a further object of the invention to provide an $SO_2$ removal process which enables the recycling of sorbent uncontaminated by dust or ash.

These and other objects and advantages will appear from the following description with reference to the drawings.

DESCRIPTION OF THE PREFERRED EMBODIMENTS

The preferred embodiments are now described with reference to the drawings, in which like numbers indicate like parts throughout the figures.

Figure 1:
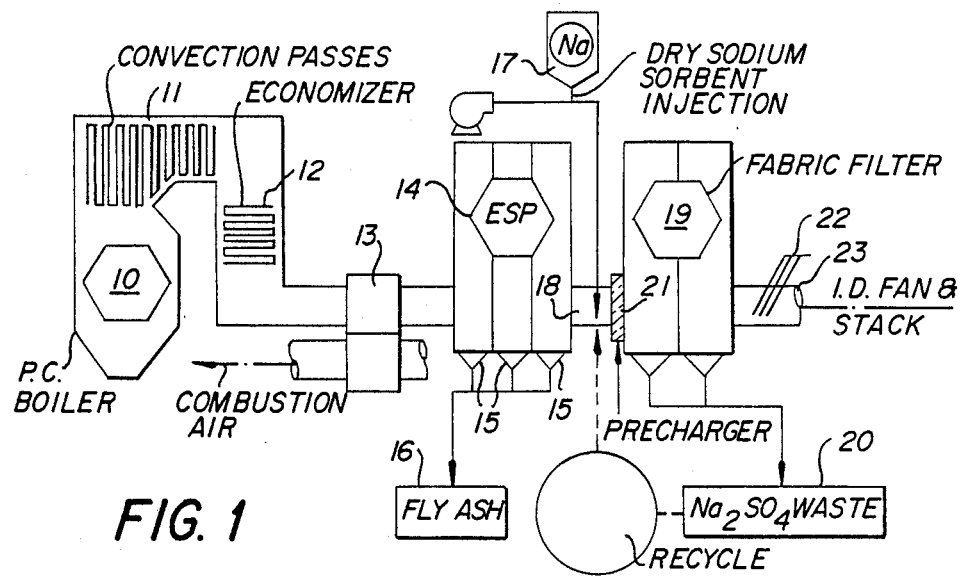
FIG. 1 is a schematic diagram illustrating a first embodiment of the invention.

FIG. 1 is a schematic drawing showing the steps of the process of this invention utilizing sodium based reactants. The exhaust train of a coal fired combustion boiler 10 is shown, whereby the flue gases exiting from the boiler first move through commonly used convection passes 11, economizer 12, and combustion air preheater 13. The flue gases are then directed into electrostatic precipitator 14, which removes particulate ash and dust in the well known manner. Typically, ninety percent or more of the particulates are removed from the flue gases. These particulates are collected as fly ash in the hoppers 15, and removed by the fly ash handling system 16. Normally, such fly ash may be either utilized for productive purposes, such as making concrete, or is disposed of in ash ponds specifically designated and permitted for this purpose.

Processes which remove $SO_2$ as part of the particulate removal process will result in combined alkali-fly ash wastes. Such combined wastes will cause disposal difficulties, especially in retrofit situations, since normal ashponds may not be suitable or would require modification to comply with other environmental laws. Furthermore, the combined product may also preclude independent sale of the fly ash.

Dry sodium-based sorbents 17, such as sodium bicarbonate, are blown into the flue gases 18, after exiting the ESP 14. The sorbent reacts with the $SO_2$ in the flue gases, forming $Na_2SO_4$ byproducts and unreacted sorbent material. The material 20 collected in the fabric filter 19 is then either disposed, processed or recycled independent of the coal fly ash.

The collection of spent sorbent in the absence of fly ash permits the operation of the fabric filter at relatively high air-to-cloth ratios (A/C), reducing the size and cost of the process equipment. In addition, with electrostatic enhancement, it may be desirable to utilize a fabric filter designed for and operated at A/C ratios considerably above conventional practice, i.e., at A/C $>>2.0$ acfm/ft$^2$. If so, an optional precharger 21 may be used to provide a supplemental charge to the sorbent to increase the porosity of the cake collected on the filter.

A low temperature heat recovery device 22 is another means of saving energy and may be located at the flue gas outlet of the fabric filter, prior to the flue gases 23 being discharged to the stack.

Figure 2:
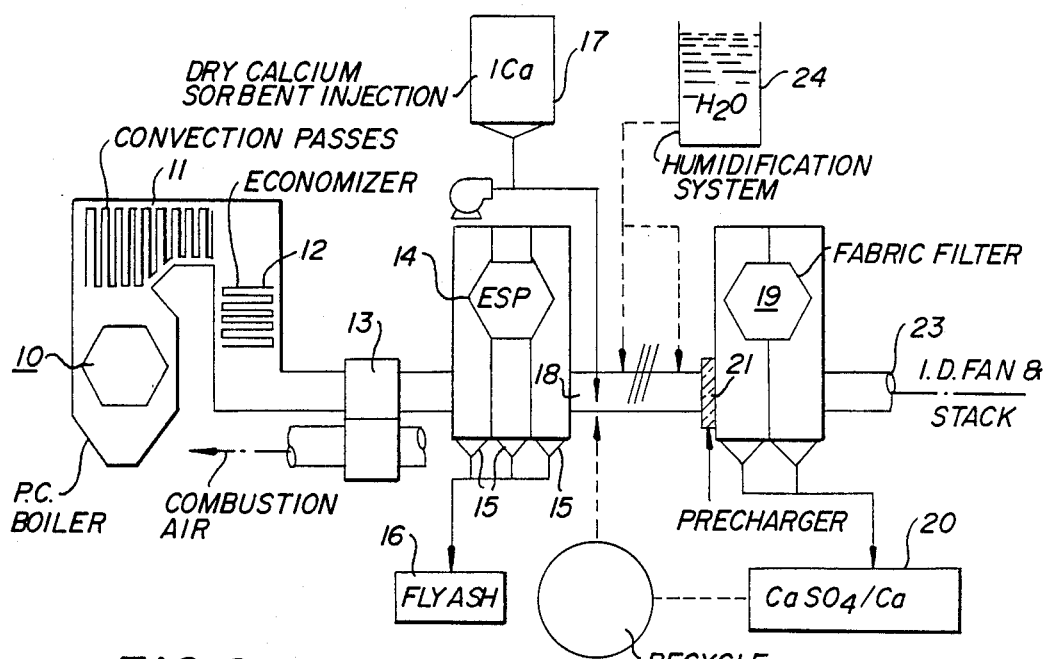
FIG. 2 is a schematic diagram illustrating a second embodiment of the invention.

FIG. 2 shows a second embodiment of the present invention, design to be utilized with calcium based sorbents, such as calcium oxide. The main elements of the process are the same. However, the heat extraction device 22 is located between the ESP and the fabric filters to lower the temperature of the combined flue gas-sorbent stream. Operation at lower temperatures, approaching the temperature for moisture saturation of the flue gas, is favorable for $SO_2$ removal by calcium-based sorbents, and improves the utilization of the sorbent, thereby lowering operating costs.

The sorbent will also combine with $SO_3$ and permit operation at the lower flue gas temperature without concern for $H_2SO_4$ deposition and corrosion. Operation at lower flue gas temperatures also enhances toxic material removal.

The application of the heat extraction device 22, a humidification system 24, or a combination thereof at the point of sorbent injection and before the fabric filter also provides for a further reduction in the size of the fabric filter and the accompanying cost savings. If the recovered heat energy could be utilized at the power plant it would result in cost savings which would more than offset the operating costs of the other components of the process.

Figure 3:
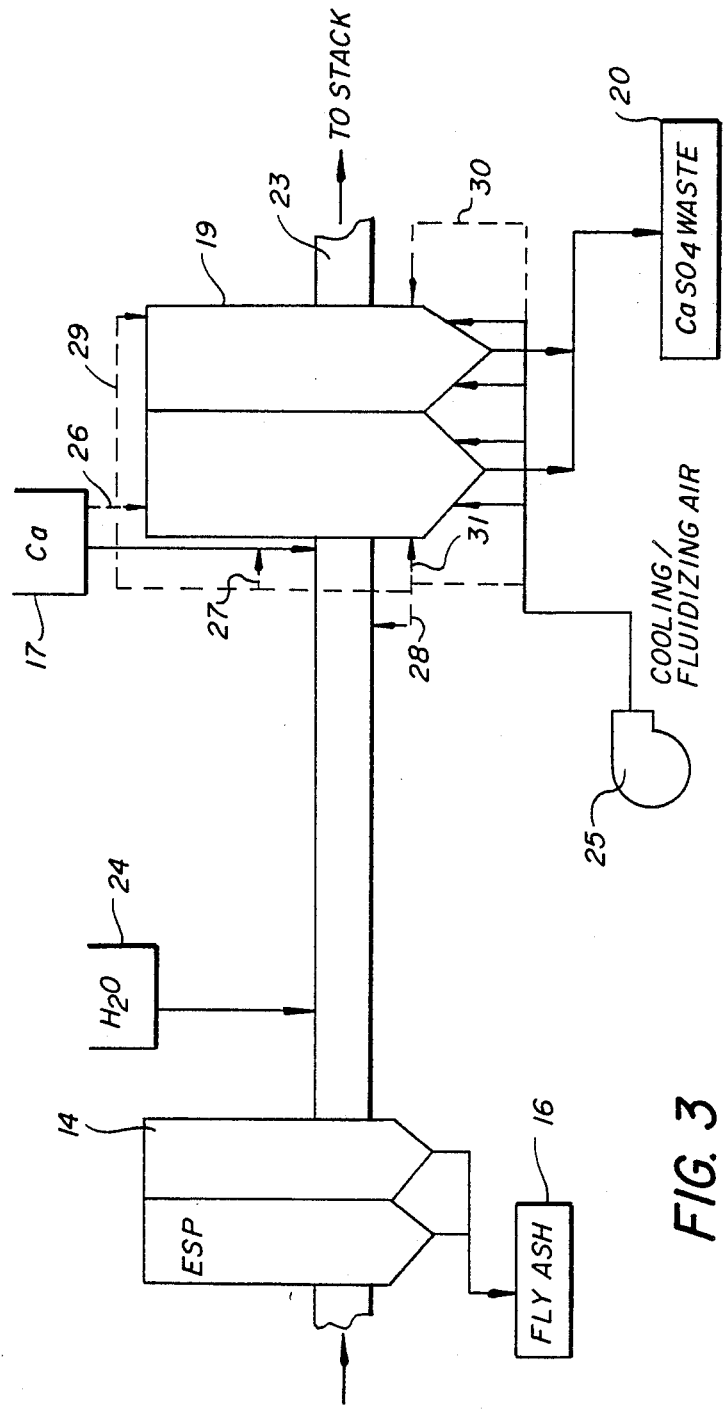
FIG. 3 is a schematic diagram illustrating a third embodiment of the invention.

FIG. 3 shows a third embodiment of the present invention, designed to be utilized with a calcium-based sorbent material, such as calcium hydroxide. Flue gas passes through convection passes, and economizer, and a combustion air preheater (not shown) similar to FIGS. 1 and 2, and then is introduced into electrostatic recipitator 14, which removes particulate ash and dust in the known manner. These particulates are collected as fly ash and removed by fly ash handling system 16. The flue gas entering and leaving the electrostatic precipitator typically has a temperature in the neighborhood of 300°F.

The temperature of the flue gas downstream of the electrostatic precipitator 14 is reduced, preferably by injection of water from a humidification system 24. After the water injection, the flue gas typically has a temperature in the neighborhood of 160 °F. The cooled flue gas is introduced into fabric filter 19, with calcium-based sorbents 17, such as calcium hydroxide or calcium oxide, being injected into the flue gas just upstream of the fabric filter unit 19. Alternatively, the calcium-based sorbents 17 are introduced directly into the fabric filter unit 19 through line 26. In any event, with the process of FIG. 3 the calcium-based sorbent material should be injected in or proximate the fabric filter unit.

Air blower 25 provides a source of cooling air, typically provided at ambient temperature, which is blown into the fabric filter unit, such as into the hopper, for several purposes. The air may be introduced as a carrier for the sorbent being injected into the fabric filter unit or into the flue gas duct immediately upstream of the fabric filter unit (such as through line 27), or the air may be separately introduced through line 28 into the flue gas ductwork immediately upstream of the fabric filter unit, or directly into the fabric filter unit through the walls or roof of the unit, such as via line 29, 30 and/or 31. Preferably, however, the cooling air is introduced through the bottom of the fabric filter unit, so that the air also provides a fluidizing function. The cooling/fluidizing air fluidizes the solids in the baghouse hopper, keeping the solids in suspension, and eliminating the need for solids recycle.

The major function of the cooling air is to provide final cooling of the flue gas to a temperature less than 20°F. above the moisture saturation temperature of the flue gas preferably less than 15° above the temperature for moisture saturation of the flue gas, and most preferably about 10°F. above the temperature for moisture saturation of the flue gas. It is known that it is difficult to uniformly cool flue gas to temperatures close to saturation temperature within a duct using water, because of temperature stratification within the duct, and the use of the cooling air permits more uniform flue gas temperatures to be achieved.

Finally, the use of the cooling air permits the alkali to be injected within the baghouse, as compared to the FIG. 2 embodiment, wherein the calcium sorbent is injected at a point of the flue gas duct work well upstream of the fabric filter.

The amount of cooling/fluidizing air should be at least sufficient to fluidize the solids in the fabric filter hopper in the preferred embodiment, and in any event sufficient to reduce the temperature of the flue gas to less than 20°F. above the moisture saturation temperature. The amount of cooling air should not be such as to reduce the flue gas temperature to a point less than 5°F. above the moisture saturation temperature of the flue gas. In a typical arrangement, wherein the flue gas entering the fabric filter has a temperature of 160°F., the amount of cooling air may be in the range of 12.5% of the flue gas, in order to produce a 10°F. cooling, when the cooling air is at a temperature of 80°F.

The process of the present invention permits the temperature of the f)flue ga to approach closer to the saturation temperature, without the duct build-up which is encountered in prior art processes, conducted in the presence of fly ash. For calcium-based sorbent material, this is of significant advantage, in that greater amounts of $SO_2$ can be removed when the flue gas temperature is only 10 °F. above the moisture saturation temperature, as opposed to the same process but with a 20°F. difference in temperature above the moisture saturation temperature. The amount of $SO_2$ removal can be raised to more than 70%, preferably more than 80%, and more preferably in the neighborhood of 85%, without causing substantial problems to the remainder of the process. This can be compared to an $SO_2$ removal of approximately 50% with water humidification and direct duct injection of the calcium-based sorbent of prior art processes, and to a $SO_2$ removal of approximate 65% with humidification accomplished by a combination of water and steam, and with the prior art injection of calcium-based sorbent in the presence of fly ash. The present invention thus provide a substantially greater reduction of $SO_2$ in the flue gas, without the duct build-up which otherwise would permit only very short times of operation before shutdown.

Figure 4:
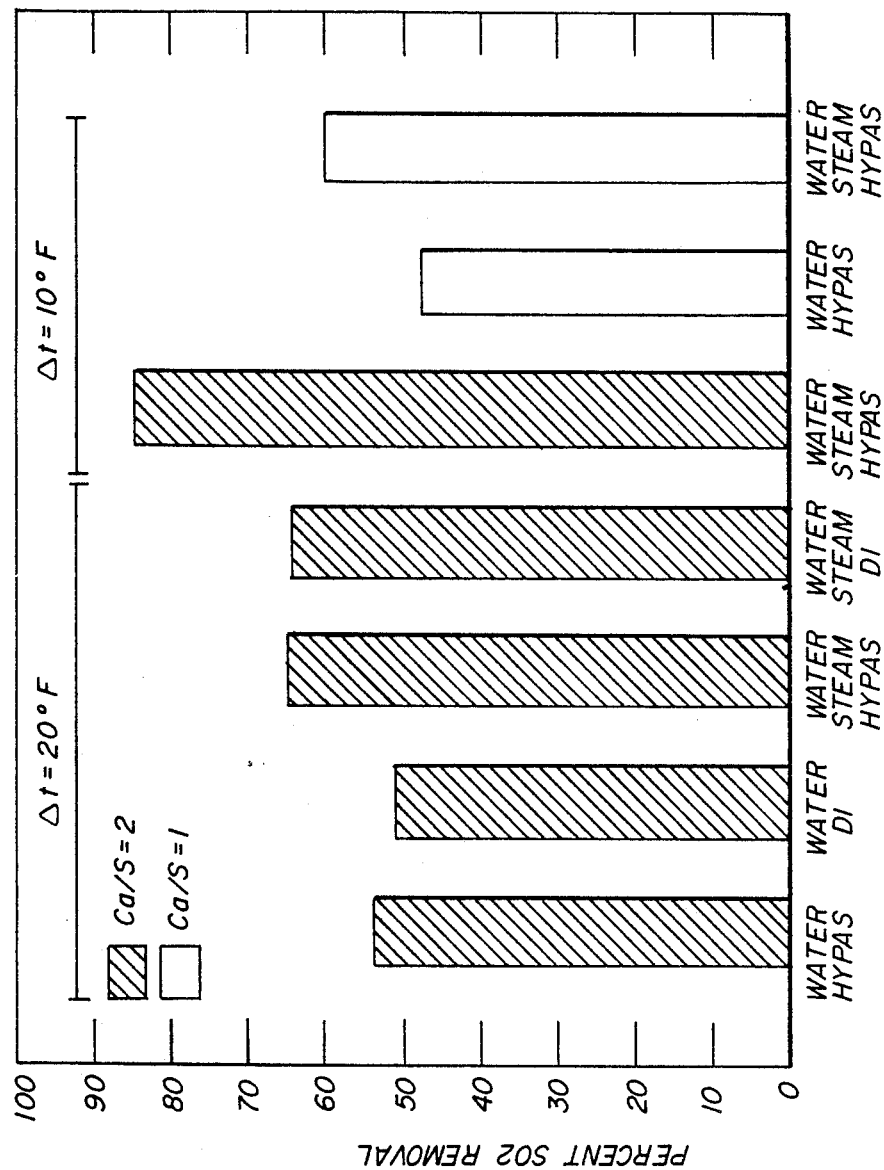
FIG. 4 is a bar graph illustrating the amount of $SO_2$ removal which can be achieved with the process of the present invention (identified as "Hypas"), as compared to a conventional prior art duct injection system (identified as "DI").

FIG. 4 illustrates in bar graph form the improved results which can be achieved with the process of the present invention using a calcium-based sorbent material. In FIG. 4, the variables include the presence ("Hypas") or absence ("DI") of an electrostatic precipitator prior to or upstream of the point of calcium injection; the presence or absence of steam as a process option (tests were being conducted to determine if steam improved $SO_2$ removal and sorbent utilization); the amount of cooling of the flue gas, with some tests conducted at a temperature 20° above the moisture saturation temperature, and other tests conducted at a temperature of 10°F. above the moisture saturation temperature; and the molar ratio of calcium in the injected sorbent to the sulfur in the waste gas stream, with the sulfur present as $SO_2$ and $SO_3$. Except for the variables mentioned above, the tests reported in FIG. 4 were under substantially identical conditions, with the Hypas process being that of FIG. 2. The results reported in FIG. 4 indicate that the removal of fly ash before the humidification/cooling step, and before the point of calcium injection, significantly improves the amount of $SO_2$ that can be removed from flue gas on a continuous basis. At a temperature difference of 20°F., the results between the process of the present invention and the prior art process were quite similar, both in the presence and absence of steam. However, at a temperature of 10 °F. above the moisture saturation temperature, the $SO_2$ removal in the process of the present invention was increased to approximately 85%. If prior art duct injection of the calcium sorbent was attempted in the presence of fly ash at a temperature of 10°F. above the moisture saturation temperature, the process would have encountered early shutdown due to duct plugging.

The process of the present invention can achieve higher $SO_2$ removal, as mentioned above. Alternatively, and as reflected by the data in FIG. 4 using a Ca/S ratio of 1, the amount of calcium utilized can be reduced, and still have approximately the same $SO_2$ removal as compared to the prior art process using greater amounts of calcium. For instance, the process of the present invention using a Ca/S ratio of 1 achieved approximately the same $SO_2$ removal as the prior art process using a Ca/S ratio of 2. That is, approximately the same $SO_2$ removal was achieved in the present process, using only one-half of the amount of calcium sorbent as used in the compared prior art process.

In the prior art duct injection processes, wherein flue gas is desulfurized by the injection of dry calcium-based sorbent into a flue gas stream containing fly ash, with temperature reduction by humidification, as the fly ash passes through the humidification zone a portion of the fly ash will be scrubbed from the gas stream by the water droplets, and deposited on the duct surfaces. Mass loading measurements have indicated that as much as 70% of the particulate material will as much as 70% of the particulate material will be removed at a temperature of 20°F. above the moisture saturation temperature. These ash deposits result in significant down time of the prior art process, to permit the duct work to be cleaned of the ash deposits. The problem of duct deposits becomes more severe as the temperature more closely approaches the moisture saturation temperature. Tests have indicated that at approach temperatures less than 20 F., the process can be operated only a few hours before pluggage becomes so severe that the ash must be cleaned from the duct work. The ash deposition problems occur in plants utilizing either fabric filters or electrostatic precipitators. In contrast, the process of the present application virtually eliminates all problems with ash deposition.

The moisture saturation temperature for flue gases is typically approximately 120°F., so that the present process is generally operated at a temperature of less than 140°F., preferably less than 135°F., and more preferably at approximately 130°F. Normally the flue gas temperature will not be reduced to less than 125°F.

We claim:

1. A process for removing pollutants, including particulates and $SO_2$, from coal fired boiler flue gases, said process comprising:

electrostatically removing particulates from the flue gas:

thereafter reducing the temperature of the flue gas to a temperature approaching the temperature for moisture saturation of the flue gas and being less than 135°F. and thereafter injecting dry calcium based sulfur reacting sorbent material into the flue gas in an amount at least sufficient to react with the $SO_2$ and $SO_3$ in the flue gas; and thereafter filtering the flue gas through a fabric filter to remove the reaction product of the sorbent material and $SO_2$, as well as unreacted sorbent material, from the flue gas.

2. A process of claim 1, wherein the flue gas temperature reduction is accomplished by heat exchange.

3. A process of claim 2, wherein the flue gas temperature reduction is accomplished by humidification of the flue gas.

4. A process of claim 7, including the further step of electrostatically enhancing the sorbent material just prior to the fabric filtering step.

5. A process for removing pollutants, including particulates and $SO_2$, from coal fired boiler flue gases, said process comprising:

electrostatically removing particulates from the flue gas;

thereafter reducing the temperature of the flue gas to a temperature which is less than 135°F. and at least 5°F. above and less than 20 °F. above the temperature for moisture saturation of the flue gas, and injecting dry calcium based sulfur reacting sorbent material into the flue gas in an amount at least sufficient to react with $SO_2$ and $SO_3$ in the flue gas; and thereafter filtering the flue gas through a fabric filter to remove the reaction product of the sorbent material and $SO_2$, as well as unreacted sorbent material, from the flue gas.

6. A process for removing pollutants, including particulate material and $SO_2$, from coal fired boiler flue gases, said process comprising (a) electrostatically removing particulates from the flue gas;

(b) thereafter reducing the temperature of the flue gas to a temperature which is more than 20 °F. and less than 50 °F. above the temperature for moisture saturation of the flue gas;

(c) thereafter passing the cooled flue gas to a fabric filter unit wherein the flue gas is filtered through a fabric filter to remove particulate material therefrom;

(d) and injecting dry calcium based sulfur reacting sorbent material into the flue gas in or proximate the fabric filter unit in an amount at least sufficient to react with the $SO_2$ and $SO_3$ in the flue gas to form a particulate reaction product which can be separated in the fabric filter unit from the flue gas, wherein the temperature of the flue gas in the fabric filter unit is further reduced by the introduction of cooling air at a temperature at least 20 °F. less than the moisture saturation temperature of the flue gas into the fabric filter unit, or proximate the fabric filter unit, in an amount such as to reduce the temperature of the flue gas exiting the fabric filter unit to a temperature which is less than 135 °F.

7. Process of claim 6, wherein the temperature of the flue gas exiting the fabric filter is less than 15°F above the flue gas moisture saturation temperature.

8. Process of claim 6, wherein the temperature of the flue gas exiting the fabric filter is about 10 °F. above the flue gas saturation temperature.

* * * * *